(12) United States Patent
Abe et al.

(10) Patent No.: US 7,500,714 B2
(45) Date of Patent: Mar. 10, 2009

(54) VEHICLE BODY FLOOR STRUCTURE

(75) Inventors: Yoshio Abe, Wako (JP); Yasunobu Onoda, Wako (JP); Yoshiyuki Toba, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/141,481

(22) Filed: Jun. 18, 2008

(65) Prior Publication Data

US 2008/0315629 A1 Dec. 25, 2008

(30) Foreign Application Priority Data

Jun. 19, 2007 (JP) ............................. 2007-161043
Aug. 6, 2007 (JP) ............................. 2007-204313

(51) Int. Cl.
*B60J 7/00* (2006.01)
(52) U.S. Cl. ............................. 296/193.07; 296/187.12; 296/187.09; 296/204
(58) Field of Classification Search ............ 296/193.07, 296/187.12, 187.09, 204, 205, 203.02, 203.03, 296/193.05, 193.09, 29
See application file for complete search history.

(56) References Cited

U.S. PATENT DOCUMENTS

2005/0189791 A1* 9/2005 Chernoff et al. ....... 296/193.07

FOREIGN PATENT DOCUMENTS

JP 11-301524 11/1999
JP 2005-119492 5/2005

* cited by examiner

*Primary Examiner*—Joseph D Pape
(74) *Attorney, Agent, or Firm*—Rankin, Hill & Clark LLP

(57) ABSTRACT

A vehicle body floor structure includes: a floor panel; a floor cross member provided on the floor panel and joined to left and side sills provided on left and right sides of the floor panel; and left and right front floor frames provided on the floor panel and extending from a dashboard cross member to a substantial middle region of the floor panel through a recessed portion of the floor cross member. The left and right front floor frames each have a rear section located rearwardly of the floor cross member, and these rear sections are bent outwardly to be joined to the left and right side sills, respectively. Each of the front floor frames may be provided on the upper surface of a downwardly concaved floor section of the floor panel and extend between the concaved floor section and the floor cross member.

7 Claims, 16 Drawing Sheets

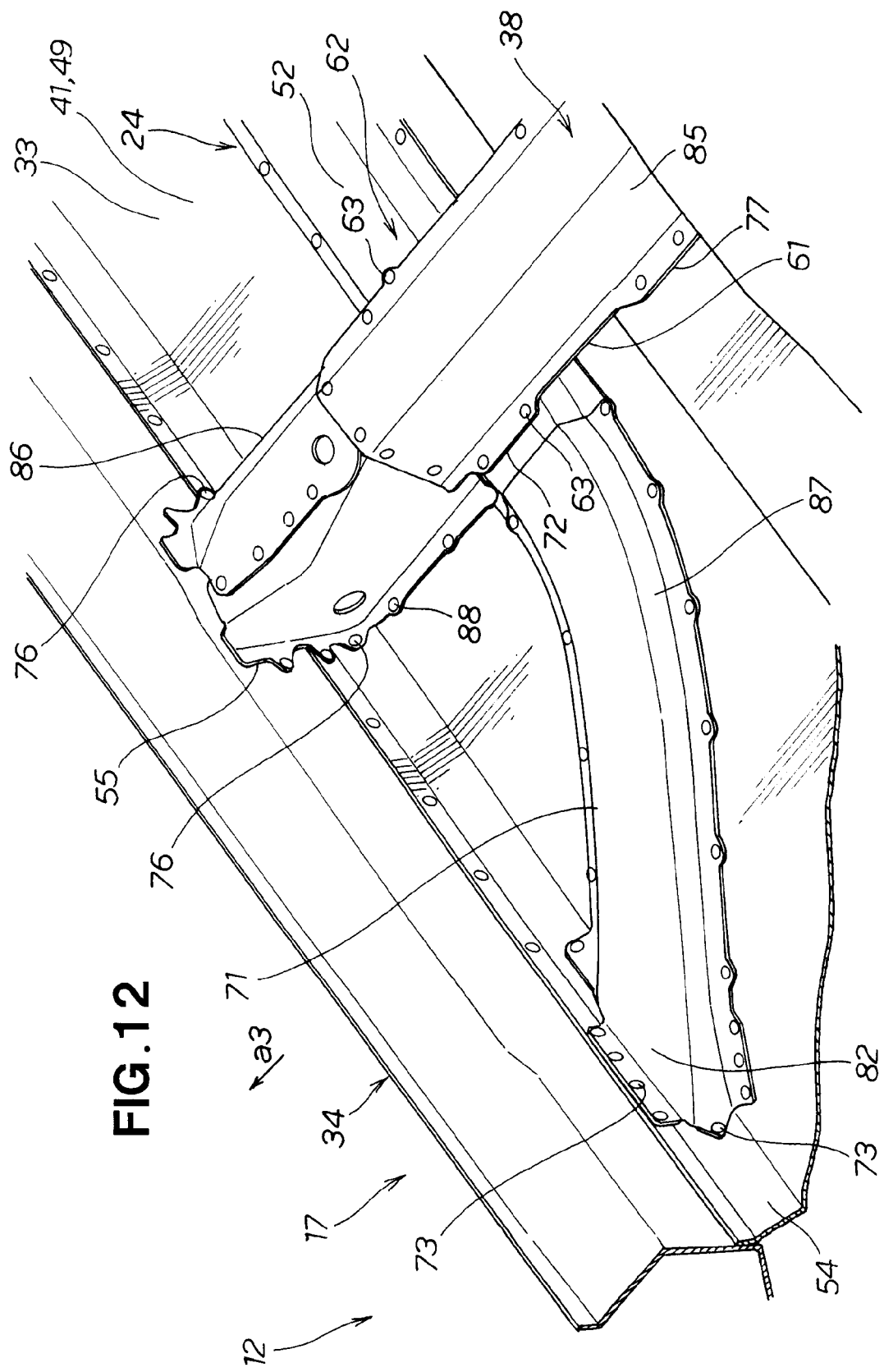

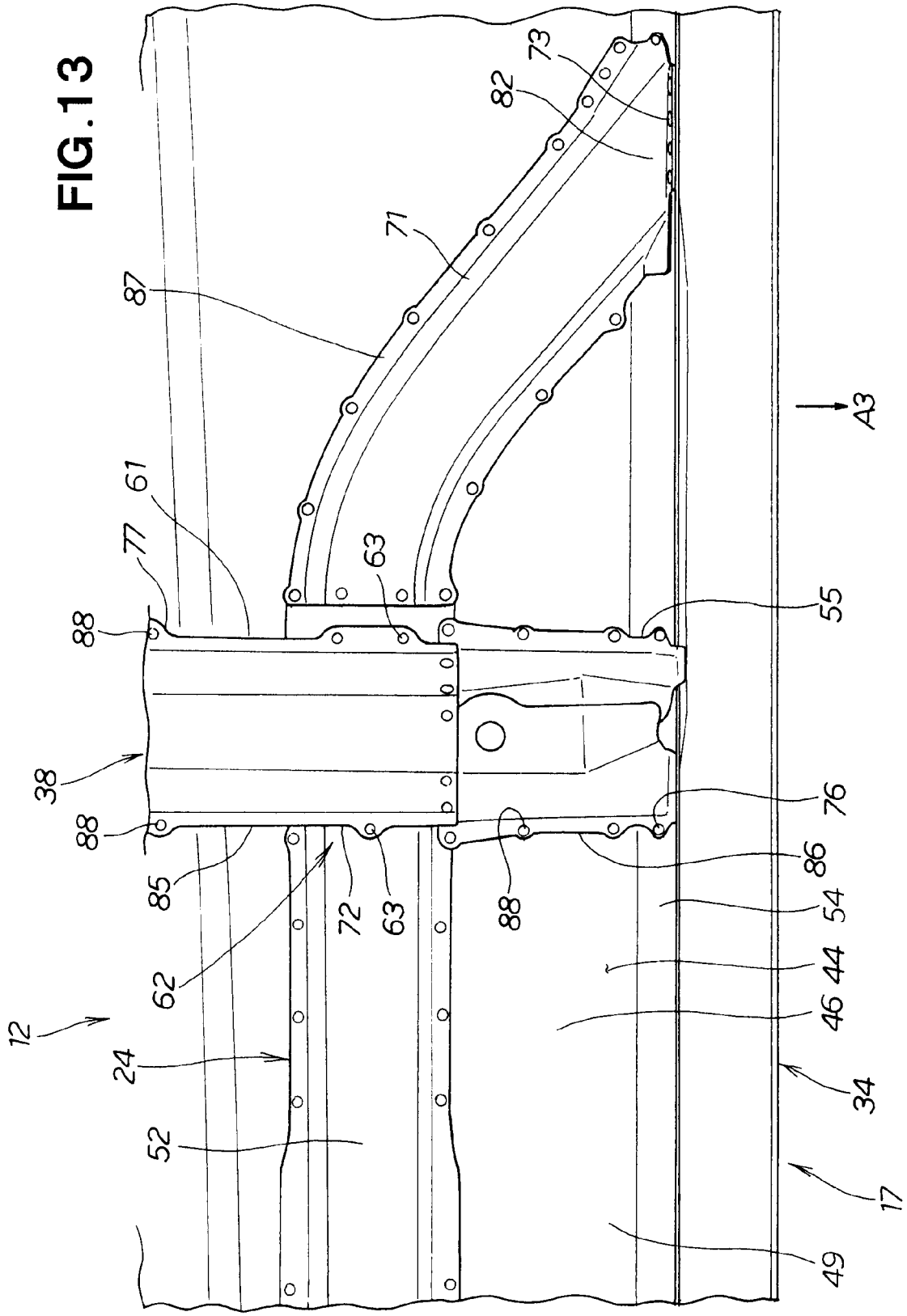

VEHICLE BODY FLOOR STRUCTURE

FIELD OF THE INVENTION

The present invention relates to a vehicle body floor structure capable of appropriately responding to a lateral or side collision impact (i.e., impact caused by a side collision of the vehicle). The present invention also relates to a vehicle body floor structure capable of appropriately responding to a frontal collision impact.

BACKGROUND OF THE INVENTION

The conventionally-known vehicle body floor structures have a function for dealing with a side collision impact and are provided with a floor cross member disposed under front seats and extending in a left-right or width direction of the vehicle body, as disclosed for example in Japanese Patent Application Laid-Open Publication No. 2005-119492.

FIGS. 16A and 16B are views explanatory of the conventional vehicle body floor structure disclosed in the 2005-119492 publication. The disclosed vehicle body floor structure 201 includes: left and right side sills provided on left and right sides of a vehicle body floor; a floor cross member 203 disposed under front seats and extending in a left-right or width direction of the vehicle body, floor frames 204 extending substantially parallel to the side sills 202 and fixedly joined at its ends to the side sills 202. With such arrangements, the disclosed vehicle body floor structure 201 can efficiently disperse a side collision impact.

However, the side collision impact dispersion capability of the disclosed vehicle body floor structure 201 is not sufficient, and thus, the disclosed vehicle body floor structure has a room for further improvement. Besides, with the disclosed vehicle body floor structure 201, the floor frames 204 would become a resistance to an airstream caused during travel of the vehicle (i.e., traveling air) and flowing under the floor panel 205, and thus, it is difficult to achieve an enhanced aerodynamic performance.

Further, Japanese Patent Publication No. 3434199, for example, discloses a vehicle body floor structure which includes a floor panel and left and right front floor frames fixedly joined to the floor panel and extending in a front-rear (i.e., longitudinal or length) direction of the vehicle and has a function for securing an suitable in-vehicle space against a frontal collision of the vehicle.

FIG. 17 is a view explanatory of the vehicle body floor structure disclosed in the 3434199 publication. In the disclosed vehicle body floor structure 221, the floor frames 224 are disposed under the floor panel, a floor cross member 225 extends in the width direction of the vehicle over the floor panel 223, and left and right forwardly-extending reinforcing members 226 and reinforcing gussets 227 are joined to the floor cross member 225. Such arrangements can increase the strength of the floor.

However, if the in-vehicle space is to be increased, the vehicle body floor structure disclosed in the No. 3434199 publication would present the problem that the height of the floor frame 224 and hence the ground height of the vehicle (from the ground surface) has to be lowered. Further, because the left and right forwardly-extending reinforcing members 226 and reinforcing gussets 227 are provided on the left and right sides of the vehicle floor, the weight of the disclosed vehicle body floor structure would undesirably increase to a considerable degree. Furthermore, because an airstream flowing under the floor panel 223 during travel of the vehicle (traveling air) interferes with the floor frames 224, it is difficult to achieve an enhanced aerodynamic performance.

SUMMARY OF THE INVENTION

In view of the foregoing prior art problems, it is a first object of the present invention to provide an improved vehicle body floor structure which can receive a side collision impact with an enhanced efficiency and achieve an enhanced aerodynamic performance of the vehicle floor.

It is a second object of the present invention to provide an improved vehicle body floor structure which can increase an inner space of the vehicle compartment, can be reduced in weight and can achieve an enhanced aerodynamic performance of the vehicle floor.

In order to accomplish the above-described object, the present invention provides an improved vehicle body floor structure, which comprises: a floor panel provided in a floor body constituting a floor of a vehicle compartment and a floor cross member disposed on the floor panel and joined to left and right side sills disposed on left and right sides of the floor panel. The vehicle body floor structure further comprising left and right front floor frames disposed on the floor panel and extending from a dashboard cross member, disposed on a front end of the floor panel, to a substantial middle region of the floor panel through a recessed portion of the floor cross member. The left and right front floor frames each having a rear section located rearwardly of the floor cross member, the rear sections of the left and right front floor frames being bent to be joined to the left and right side sills, respectively.

Each of the front floor frames is disposed on the floor panel and extends rearward from the dashboard cross member, through the recessed portion of the floor cross member, to the substantial middle region of the floor panel, and then it bends toward the corresponding side sill to be joined to the side sill. Thus, when an impact has been applied to any one of the side sills and floor cross member at the time of a side collision of the vehicle, the side sill and floor cross member are plastically deformed toward the interior of the vehicle, and the applied impact is transmitted and dispersed via the recessed portion of the floor cross member to the front floor frames, and thus, the side collision impact can be efficiently received and borne by the front floor frames.

Further, in the vehicle body floor structure, where the front floor frames are provided on the floor panel, the lower or outer surface of the floor panel can be made flat, so that resistance to an airstream flowing under the bottom of the vehicle during travel of the vehicle can be significantly reduced and thus an enhanced aerodynamic performance of the vehicle floor can be achieved.

In a preferred form, the floor panel is located lower than a longitudinal middle section (e.g., tunnel section) of the vehicle body floor structure.

According to another aspect of the present invention, there is provided an improved vehicle body floor structure, which comprises: a floor body constituting a floor of a vehicle compartment and a floor cross member disposed on a floor panel of the floor body and extending in a width direction of the vehicle. The vehicle body floor structure further comprising left and right front side frames; and left and right front floor frames joined to respective rear portions of the left and right front side frames and extending to a substantial middle region of the floor panel, the floor panel having a downwardly concaved floor section (i.e., lowered floor section), each of the front floor frames being disposed on an upper surface of the downwardly concaved floor section, each of the front floor frames extending between the downwardly concaved floor section and the floor cross member and joined to the floor cross member.

Because the floor panel has the downwardly concaved floor section and each of the front floor frames is disposed on the upper surface of the downwardly concaved floor section and extends between the downwardly concaved floor section and the floor cross member, the present invention can enlarge the inner space of the vehicle compartment although the floor frames are located on the upper surface of the floor panel. Further, because the front floor frames are joined to the floor cross member, a frontal collision impact can be transmitted from the rear portions of the left and right front side frames to the front floor frames as just a compressive force, and thus, the vehicle body floor structure of the present invention can secure a sufficient mechanical strength. Consequently, the vehicle body floor structure of the invention can dispense with particular reinforcing members without sacrificing the mechanical strength. Thus, the rear portion of each of the front side frames need not be constructed as a dual structure with some reinforcing member incorporated therein, so that the vehicle body floor structure can be advantageously reduced in weight.

Further, in the vehicle body floor structure of the present invention, the floor panel has the downwardly concaved floor section (lowered floor section) and each of the front floor frames is disposed on the upper surface of the downwardly concaved floor section, extends between the downwardly concaved floor section and the floor cross member and is joined to the floor cross member. Namely, the front floor frames are not located outside the vehicle compartment and do not project downwardly of the floor panel, and thus, an airstream flowing under the floor panel during travel of the vehicle is subjected to only a small resistance. As a result, the vehicle body floor structure of the present invention can achieve an enhanced aerodynamic performance. Furthermore, a frontal collision impact is transmitted from the front side frames to the floor cross member by way of the front floor frames, and thus, the vehicle body floor structure of the present invention can enhance the mechanical strength without increasing the weight.

In one preferred form, portions of the left and right front side frames underlie the left and right front floor frames, respectively, with the floor panel interposed therebetween.

In an embodiment, the left and right front floor frames each have a rear section located rearwardly of the floor cross member, and the rear sections of the left and right front floor frames are bent away from each other toward the left and right outer side edges of the vehicle compartment to be joined to the left and right side sills, respectively, that connect to the left and right outer sides of the floor panel. Thus, a frontal collision impact is transmitted to the side sills by way of the front floor frames, so that the vehicle body floor structure of the present invention can enhance the mechanical strength without increasing the weight.

In a preferred form, each of the opposite end portions of the floor cross member is formed of two pressed members secured together in overlapping relation to each other.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 12 is a view taken in a direction of arrow A12 of FIG. 10;

FIG. 13 is a view taken in a direction of arrow A13 of FIG. 10;

DETAILED DESCRIPTION OF THE PREFERRED EMBODIMENTS

Figure 1:
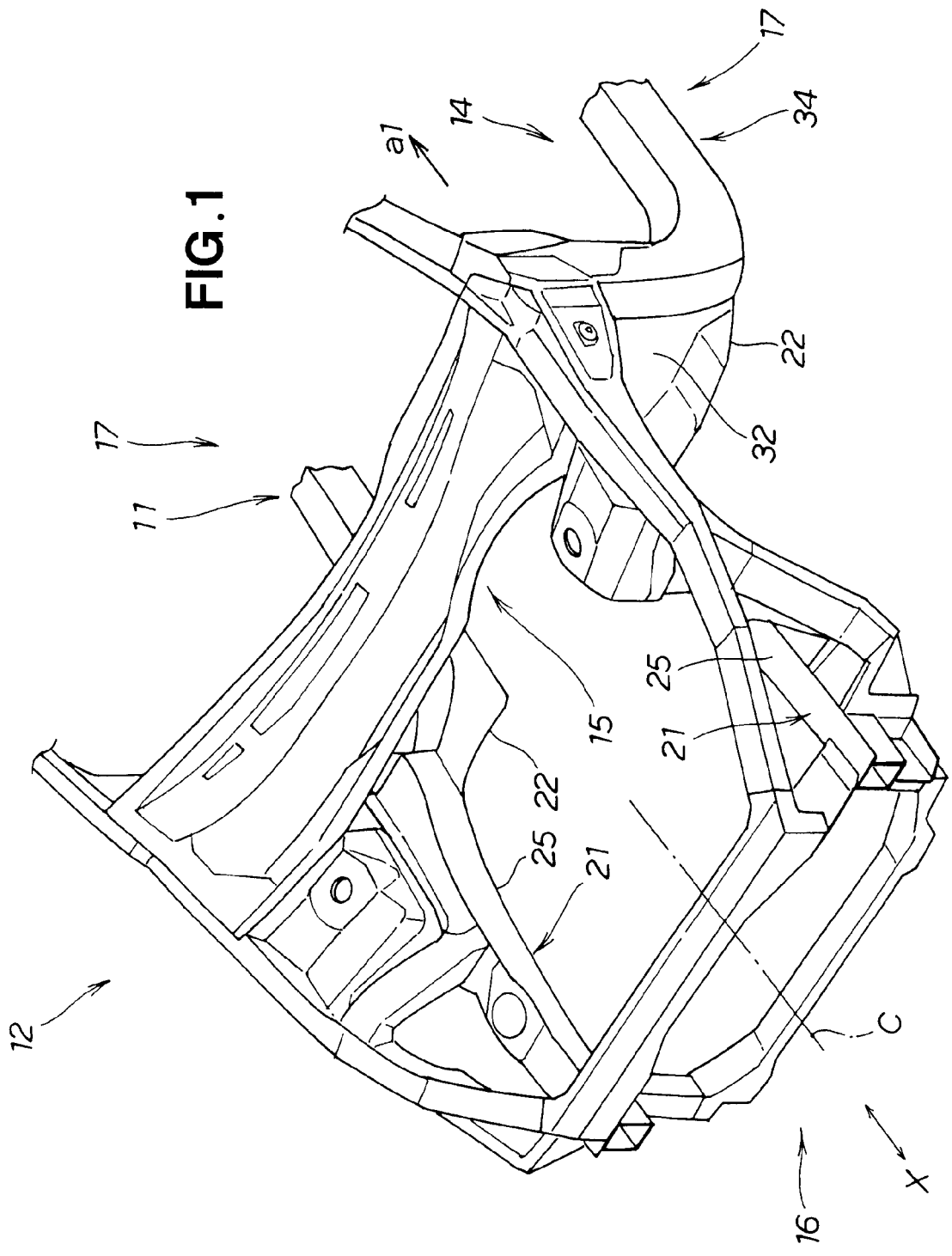
FIG. 1 is a perspective view of a front body connecting to a vehicle body floor structure according to a first embodiment of the present invention.
Figure 2:
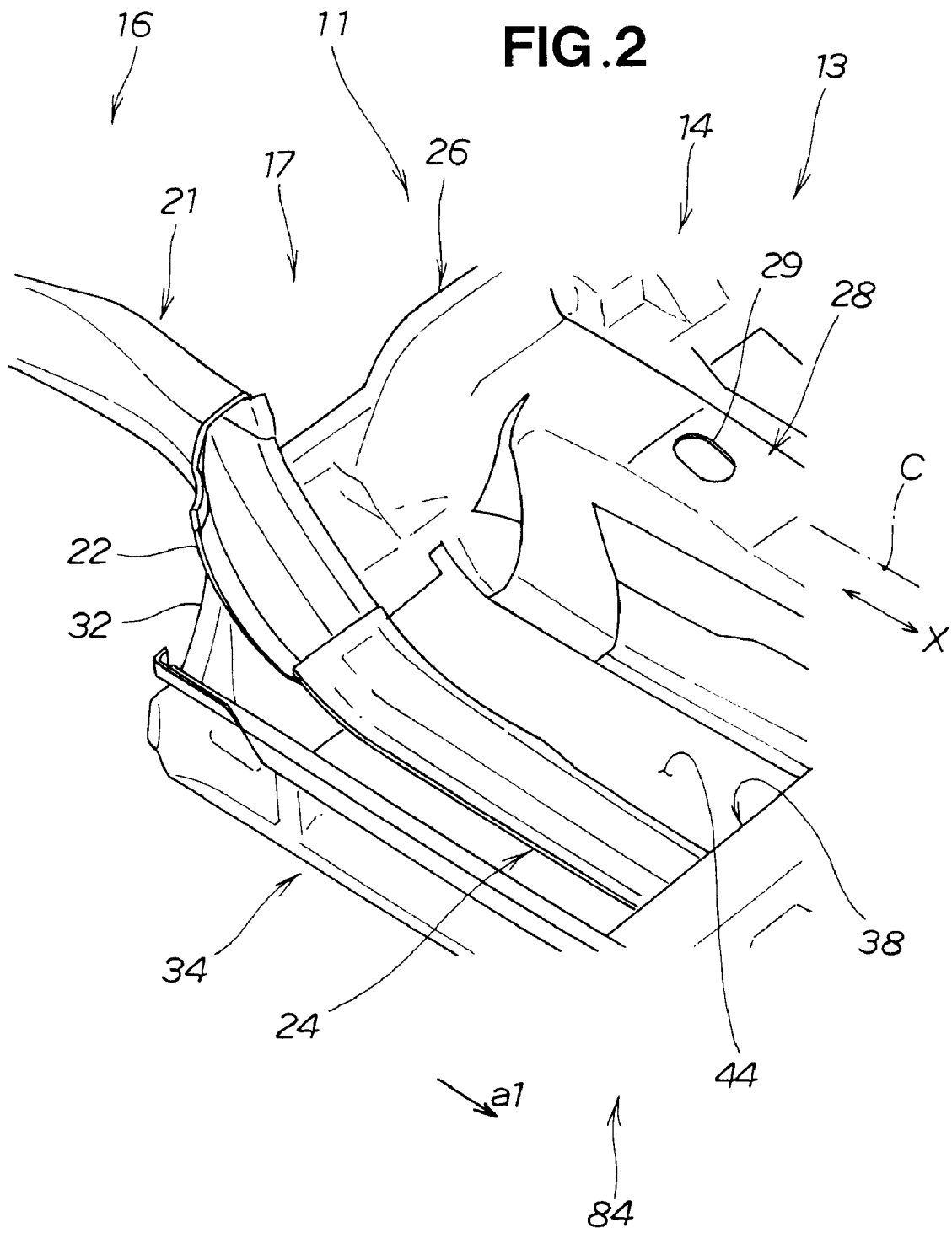
FIG. 2 is a perspective view of a front floor frame connecting to the vehicle body floor structure of the invention.

Reference is now made to FIG. 1 showing in perspective a front body connecting to a vehicle body floor structure 11 according to a first embodiment of the present invention and FIG. 2 showing in perspective a front floor frame 24 connecting to the vehicle body floor structure 11.

The vehicle body floor structure 11 is employed in a floor body 14 that constitutes a floor of a compartment 13 of a vehicle 12; details of the vehicle body floor structure 11 will be discussed later.

The vehicle 12 includes the floor body 14 constituting the floor, left and right side bodies 17 that constitute side walls of the vehicle compartment 13, a front body 16 disposed in front of the vehicle compartment 13, and a dashboard 15 that constitutes a wall separating the front body 16 from the vehicle compartment 13. The left and right side bodies 17 include left and right side sills 34 and 37 (FIG. 3) joined to the left and right sides of the floor body 14.

The front body 16 includes left and right front side frames 21 that are located in substantial left-right symmetrical relation to each other about a longitudinal centerline C of the vehicle 12. Front floor frames 24 connecting to respective rear ends 22 of the front side frames 21 extend toward a longitudinal middle region of the floor body 14 (i.e., in a direction of arrow a1). The floor body 14 includes the vehicle body floor structure 11 of the present invention.

Figure 3:
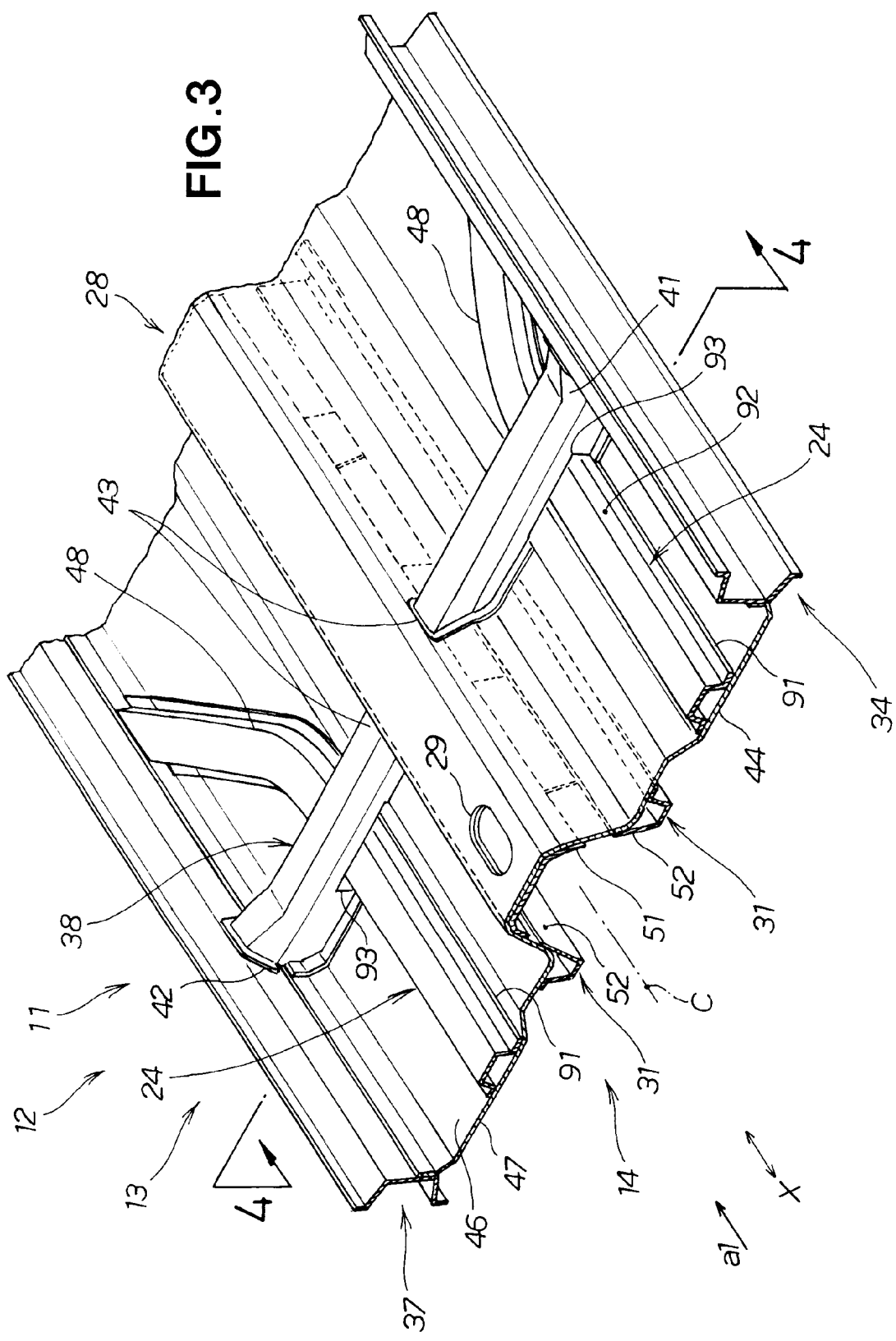
FIG. 3 is a perspective view of the vehicle body floor structure of the invention.

FIG. 3 is a perspective view of the vehicle body floor structure 11, and the vehicle body floor structure 11 will be described below with combined reference to FIGS. 1, 2 and 3. The vehicle body floor structure 11 includes: a dashboard cross member 26 connected to the lower end of the dashboard 15 located in front thereof and connected to the rear ends of the left and right front side frames 21; a tunnel section 28 having an opening 29 and extending rearward from a middle region of the dashboard cross member 26 in the longitudinal or length direction (X-axis direction) of the vehicle 12; and left and right tunnel frames 31 fixedly joined to the left and right side edges of the tunnel section 28.

The vehicle body floor structure 11 provided in the floor body 14 further includes: the left side sill 34 connected to one (left in the illustrated example) end 32 of the dashboard cross member 26 and extending rearward in the length or X-axis direction (i.e., in the direction of arrow a1); the right side sill 37 connected to the other (right in the illustrated example) end of the dashboard cross member 26 and extending rearward in the length direction in parallel to the left side sill 34; and a floor cross member 38 disposed between the left and right side sills 34 and 37. The floor cross member 38 has a left end 41 fixedly joined to the left side sill 34, a right end 42 fixedly joined to the right side sill 37, and middle portions 43 fixedly joined to the tunnel section 28. The front floor frames 24 and floor cross member 38 of the vehicle body floor structure 11 are located in the vehicle compartment 13.

The vehicle body floor structure 11 further includes a floor panel 44 fixedly joined to the underside of the floor cross member 38, and the floor panel 44 has its left and right side edges fixedly joined to the left and right side sills 34 and 37, respectively. The floor panel 44 also has a middle portion fixedly joined to the tunnel section 28, an inner (upper in the figure) surface 46 facing the interior of the vehicle compartment 13 and an outer (lower in the figure) surface 47 facing the ground surface. Lateral portions of floor panel 44 are positioned lower than the tunnel section 28 extending longitudinally centrally on the vehicle body floor structure 11.

Further, in the vehicle body floor structure 11, the front floor frames 24 are fixedly joined to the inner surface 46 of the floor panel 44. Each of the front floor frames 24 extends rearwardly from the dashboard cross member 26 (see FIG. 2) to a longitudinal middle region (in the direction of arrow a1) of the floor panel 44, passes through the floor cross member 38 and then bends at a bent portion 48 toward a corresponding one of the side sills 34 and 37; the bent portion 48 is fixedly joined at its rear end to the corresponding side sill 34 or 37. The front floor frames 24 are located in substantial left-right symmetrical relation to each other about the centerline C of the vehicle 12.

Figure 4:
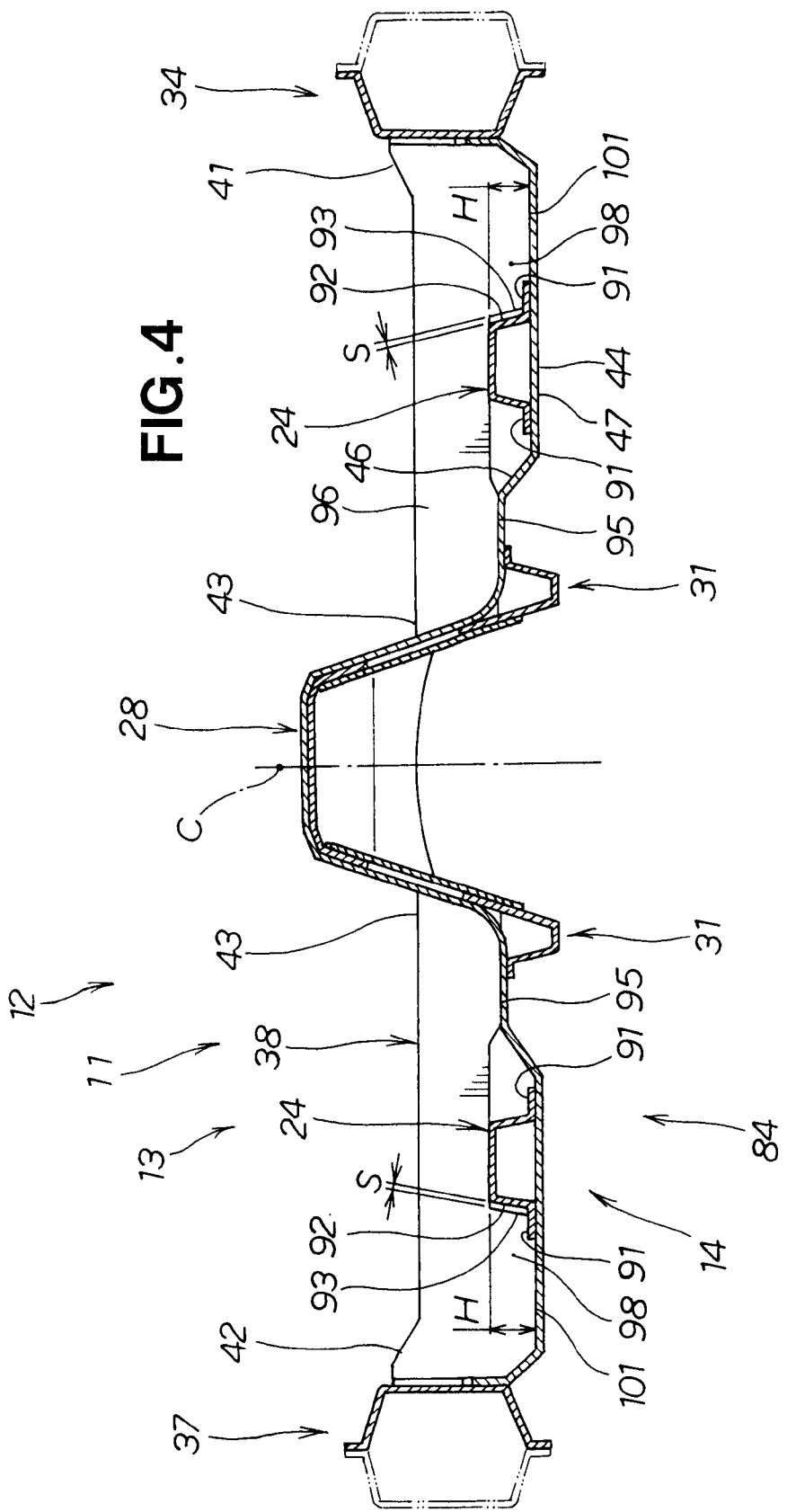
FIG. 4 is a sectional view taken along line 4-4 of FIG. 3.

FIG. 4 is a sectional view taken along the line 4-4 line of FIG. 3, which will be described below with combined reference to FIGS. 2, 3 and 4.

Each of the front floor frames 24 has a channel (inverted-U) cross-sectional shape (i.e., shape of a section made by cutting the front floor frame 24 transversely at right angles to the longitudinal axis of the frame 24), with an opening of the frame 24 of the channel (inverted-U) cross-sectional shape oriented toward the floor panel 44 and opposite horizontal flanges 91 of the frame 24 fixedly joined to the inner surface 46 of the floor panel 44. Outer wall 92 (oriented in a direction of arrow 2a) of each of the front floor frames 24 is disposed in a recessed portion 93, formed in the floor cross member 38, with a gap S left between the outer surface of the outer wall 92 and the inner surface of the recessed portion 93. With such a gap S, it is possible to set a relatively great assembling tolerance, which facilitates assembly of the vehicle body floor structure 11. Alternatively, the outer wall 92 may be fitted in and joined to the recessed portion 93 with no gap S. The recessed portion 93 is formed in each of two panel-joining sections 95 of the cross member 38 to which the floor panel 44 is joined.

More specifically, in each region of a cross member body 96, an engagement section 98 is included that is adjacent to the side sills 34 and 37, and the engagement section 98 has generally the same height as a height H of the corresponding floor frame 24. The engagement section 98 has a lower joining portion 101 fixedly joined to the inner surface 46 of the floor panel 44, and the engagement section 98 is disposed adjacent to the corresponding front floor frame 24 with the gap S therebetween.

The following paragraphs describe behavior of the vehicle body floor structure 11 according to the first embodiment of the present invention.

Figure 5:
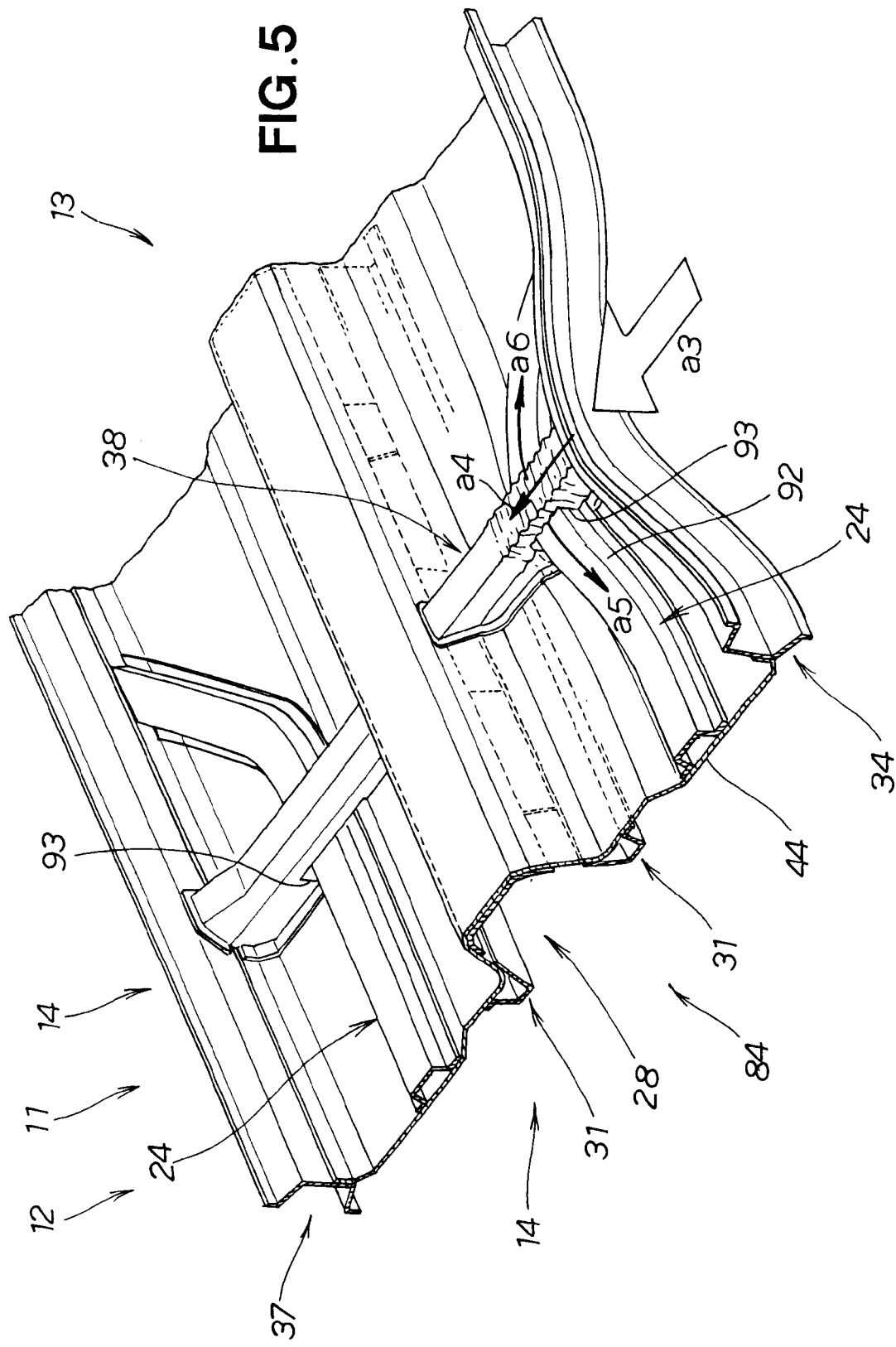
FIG. 5 is a view explanatory of a mechanism employed in the vehicle body floor structure for dispersing a side collision impact.

FIG. 5 is a view explanatory of a mechanism employed in the vehicle body floor structure 11 for dispersing a side collision impact. Once an impact is applied to the left side surface of the vehicle 12 as indicated by arrow a3, the floor cross member 38 is plastically deformed, as indicated by arrow a4, together with the left side sill 34, so that the recessed portion 93 of the floor cross member 38 abuts against the outer wall 92 of the front floor frame 24 to apply a load to the outer wall 92. Consequently, the front floor frame 24 is plastically deformed inwardly toward the centerline of the vehicle 12 (i.e., in a direction of arrow a4) to thereby absorb the impact.

Namely, the applied impact is transmitted via the recessed portion 93 of the floor cross member 38 to the front floor frames 24 as indicated by arrows a5 and a6, and thus, the side collision impact can be efficiently received. Once an impact is applied to the right side surface of the vehicle 12 too, there occurs the same behavior and effect as set forth above.

Further, in the vehicle body floor structure 11 shown in FIG. 4, where the front floor frames 24 are located on the inner side the floor panel 44 facing the vehicle compartment 13, not outside the vehicle compartment 13, so that the vehicle body floor structure 11 can achieve a significantly enhanced aerodynamic performance of a bottom 84 of the vehicle 12. Namely, because the front floor frames 24 are fixedly joined to the inner surface 46 of the floor panel 44, the outer surface 47 of the floor panel 44 can be made flat, so that resistance to an air stream flowing under the bottom 84 of the vehicle 12 can be significantly reduced.

Figure 6:
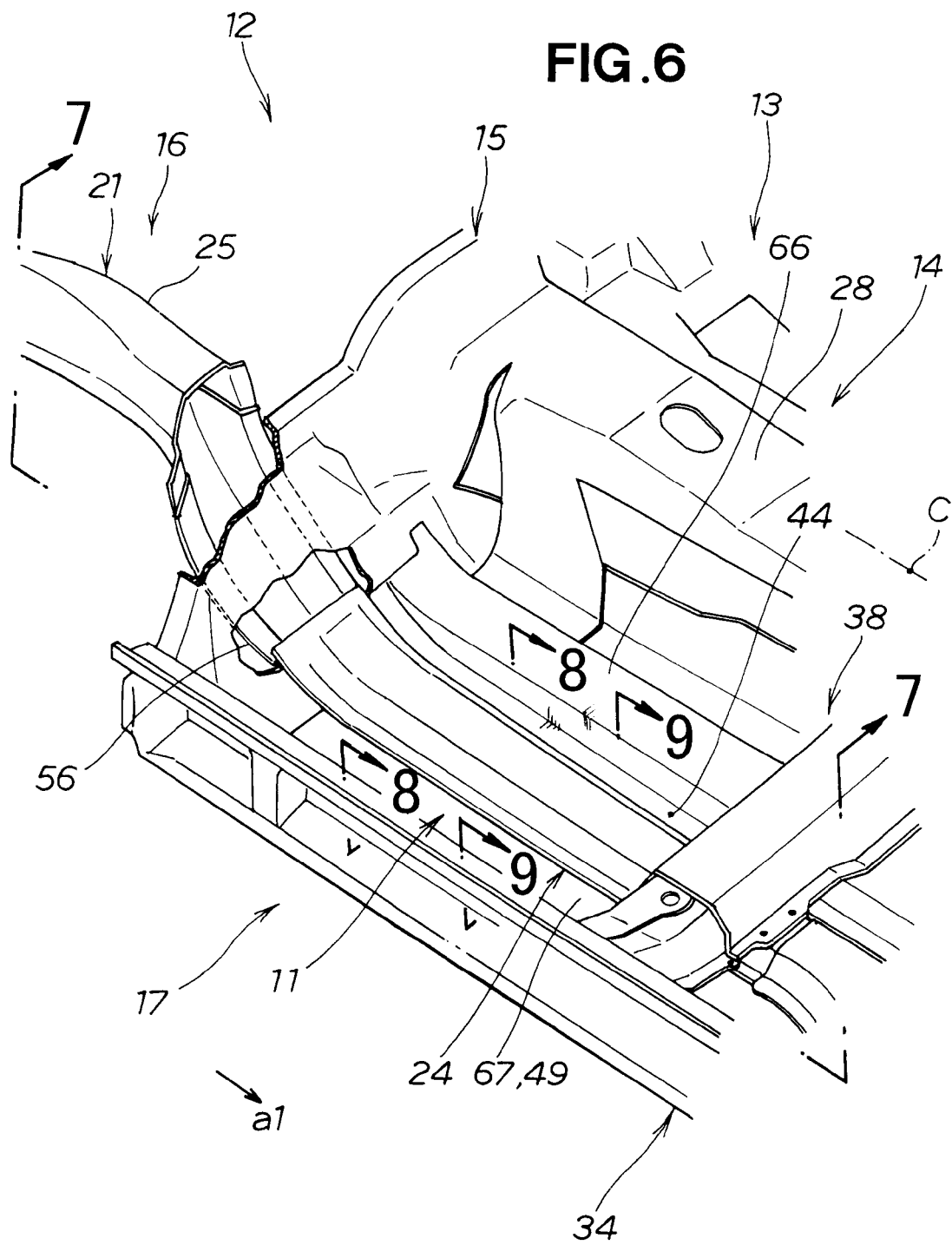
FIG. 6 is a perspective view showing a vehicle body floor structure according to a second embodiment of the invention.

FIG. 6 is a perspective view showing a vehicle body floor structure 11 according to a second embodiment of the present invention, where the same reference numerals and characters as used in relation to the above-described first embodiment depict the same elements as in the first embodiment. Each of the left and right front side frames 21 includes a body portion 25 extending substantially horizontally, a curved portion 56 integrally formed with the body portion 25 to extend downward from the body portion 25, and a rear portion 27 (see FIG. 7) integrally formed with the curved portion 56 and fixedly joined to the floor body 14. The front floor frame 24 connects to the rear portion 27 and extends to the longitudinal middle region (in the direction of arrow a1) of the floor panel 44. Namely, the front floor frames 24 and floor cross member 38 are disposed on the inner surface of the floor panel 44 facing the interior of the vehicle compartment 13.

Figure 7:
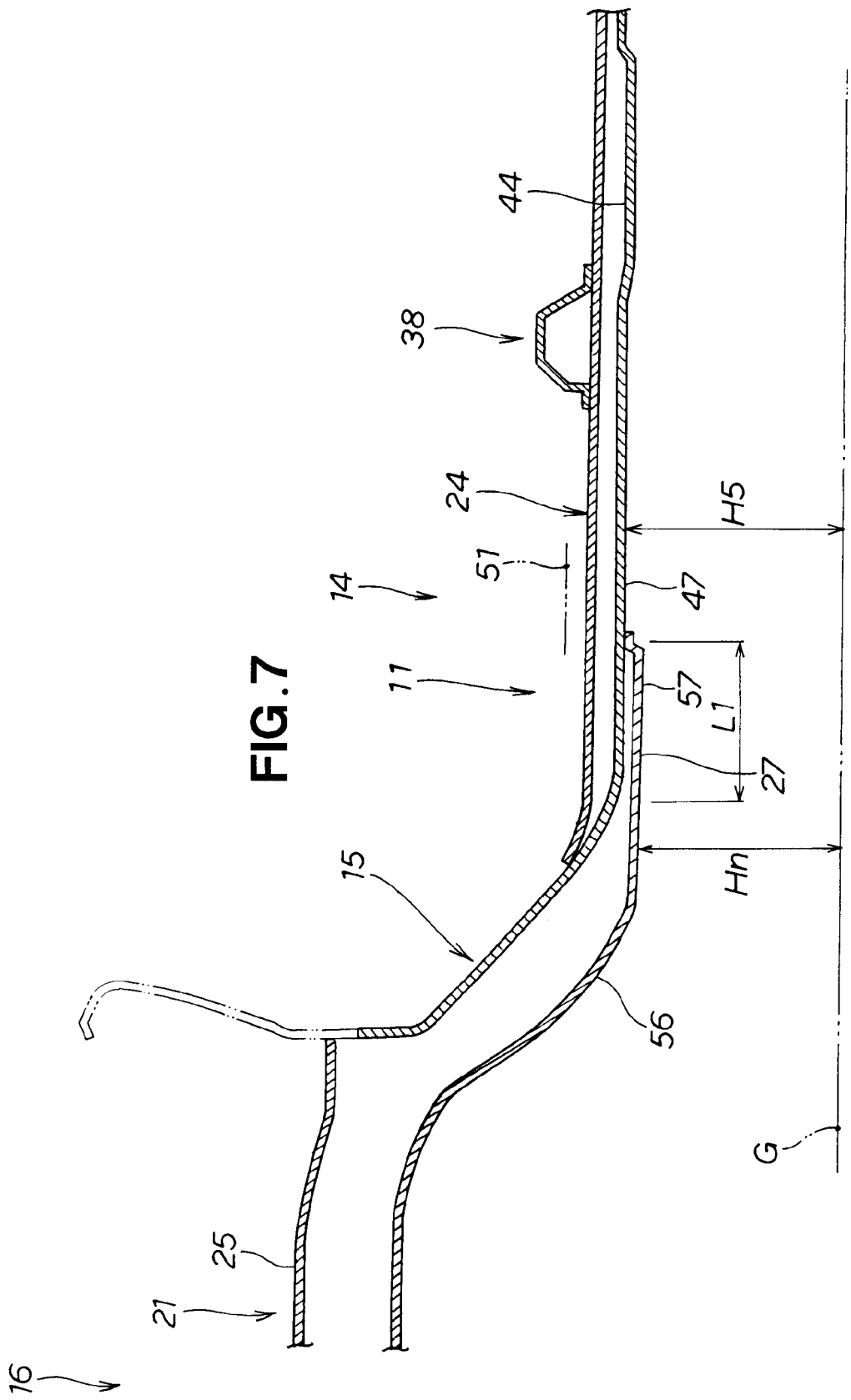
FIG. 7 is a sectional view taken along line 7-7 of FIG. 6.
Figure 8:
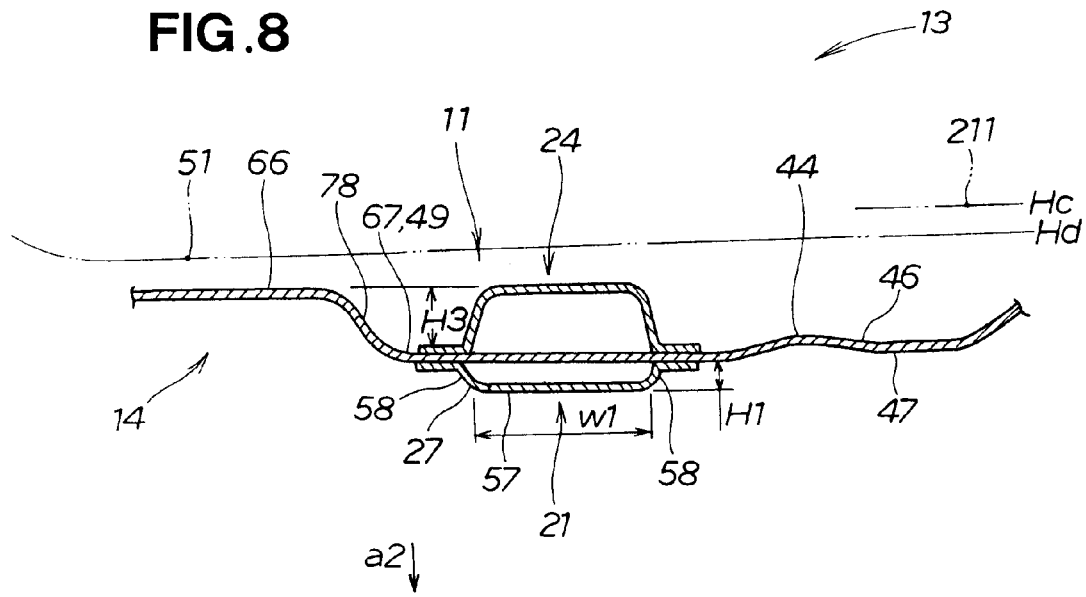
FIG. 8 is a sectional view taken along line 8-8 of FIG. 6.

FIG. 7 is a sectional view taken along the 7-7 line of FIG. 6, and FIG. 8 is a sectional view taken along the 8-8 line of FIG. 6. As shown, in the vehicle body floor structure 11, the rear portion 27 of the front side frame 21 is fixedly joined to the lower surface 47 of the floor panel 44. As seen from FIG. 8, the rear portion 27 of the front side frame 21 is formed into a substantially channel, groove or U sectional shape, which has a first groove bottom 57 parallel to the floor panel 44 and opposite side portions 58 extending obliquely upwardly from the first groove bottom 57. The side portions 58 have a height H1 that is about 15% of a width W1 of the first groove bottom 57, and the side portions 58 do not practically project upwardly beyond the lower surface 47 of the floor panel 44. Height Hn, from the ground surface G, of the first groove bottom 57 of the rear portion 27 of the front side frame 21 is the same as the height in the conventionally-known vehicle floor structures (e.g., the height of the floor frame 224 of FIG. 17), and the first groove bottom 57 underlies the front floor frame 24 in lapped relation thereto over a length L1 with the floor panel 44 interposed therebetween.

Figure 9:
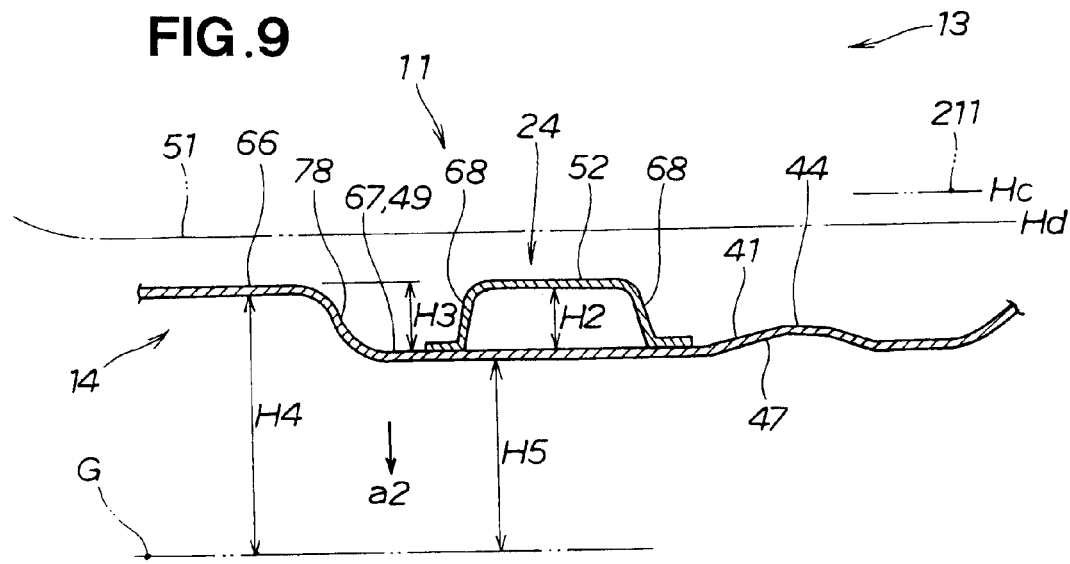
FIG. 9 is a sectional view taken along line 9-9 of FIG. 6.

FIG. 9 is a sectional view taken along the 9-9 line of FIG. 6. The front floor frame 24 has a further rear portion of a substantially channel, groove or inverted U sectional shape and fixedly joined to the upper surface 46 of the floor panel 44. The further rear portion of the front floor frame 24 has a second groove bottom 52 parallel to the floor panel 44 and opposite side portions 68 integrally extending obliquely downward from the second groove bottom 52. The opposite side portions 68 have a height H2.

The floor panel 44 has the above-mentioned tunnel section 28, floor body sections 66 integrally formed with the tunnel section 28, and a downwardly concaved floor section 67 concaved in a downward direction (direction of arrow a2) of the vehicle compartment 13. Floor rib portion 78 is formed on the concaved floor section 67 and has a height H3. The front floor frame 24 is disposed on the upper surface 49 of the downwardly concaved floor section 67, and the front floor frame 24 has generally the same height as the height H3 of the floor rib portion 78 of the downwardly concaved floor section 67.

The floor body section 66 has a height H4 from the ground surface lower than the height in the conventionally-known floor structures (e.g., height of the floor panel 223 of FIG. 17), so that a carpet 51 put on the floor panel 44 too is located lower than a carpet 211 in the conventionally-known floor structures.

Figure 17:
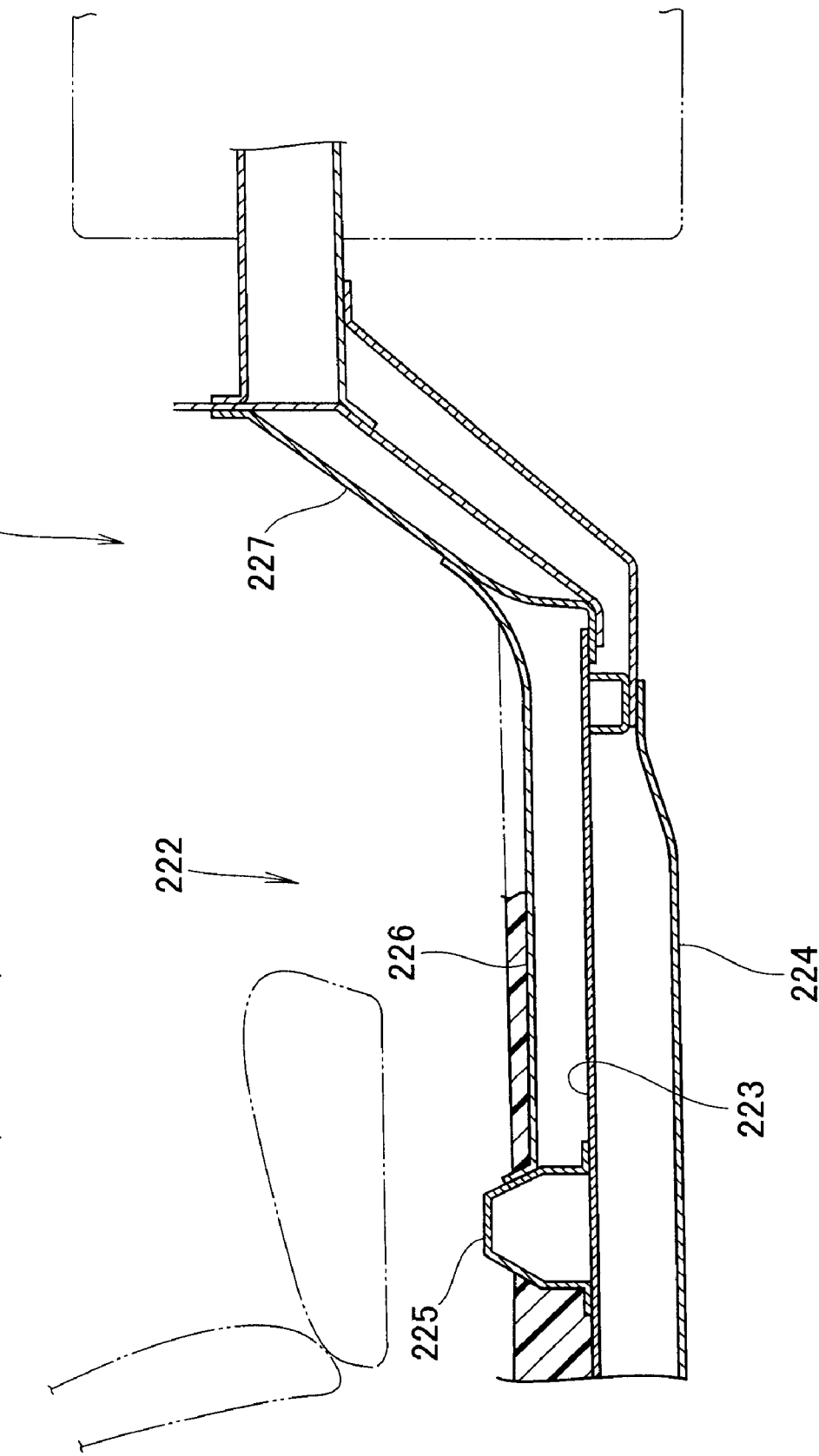
FIG. 17 is a view illustrating another conventionally-known vehicle body floor structure.

The downwardly concaved floor section 67 has a height H5 from the ground surface lower than the conventionally-known floor panels (e.g., the floor panel 223 of FIG. 17), which is substantially the same as the conventionally-known floor frames (e.g., floor frame 224 of FIG. 17).

Figure 10:
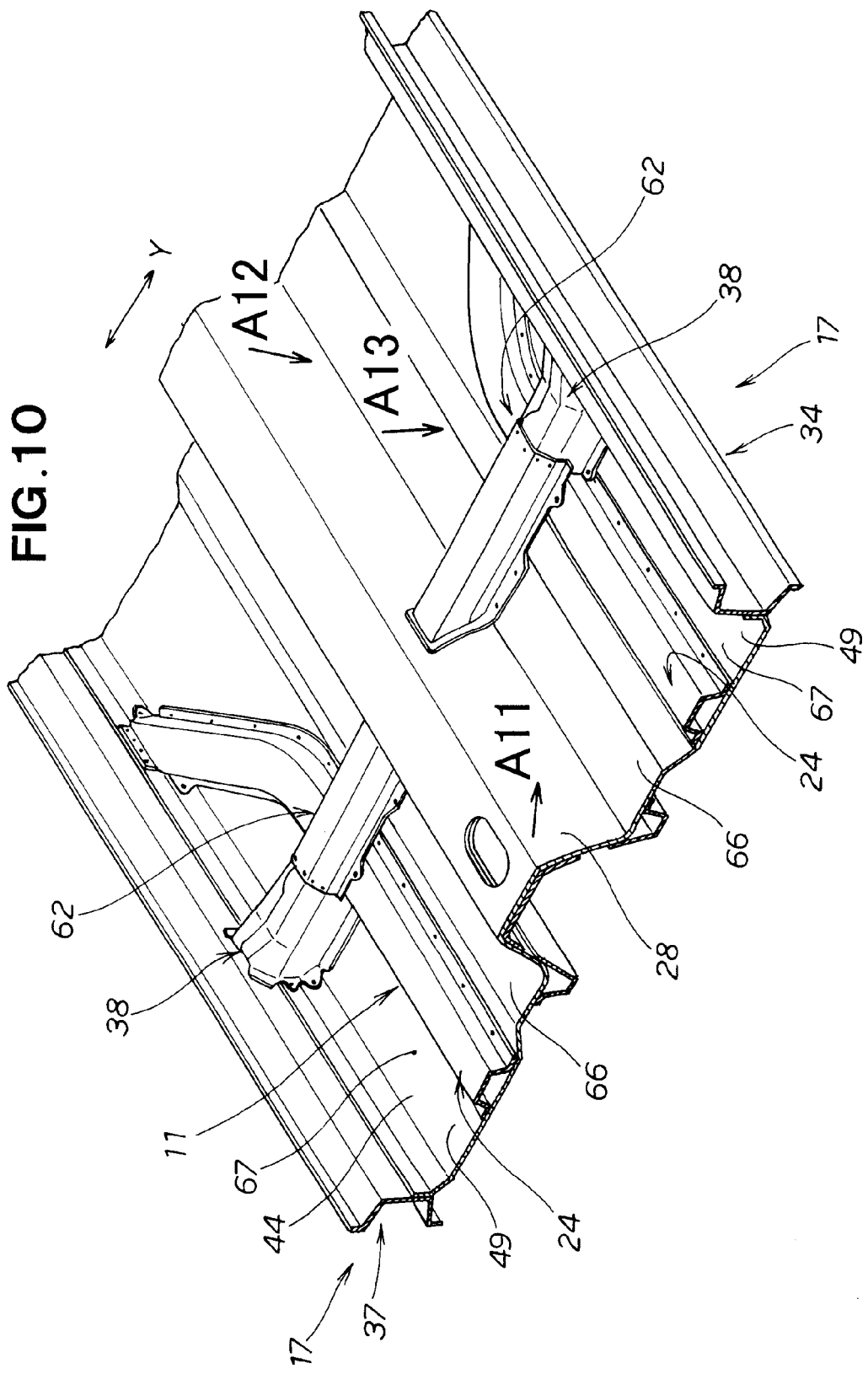
FIG. 10 is a perspective view showing left and right rear sections of the vehicle body floor structure shown in FIG. 6.

FIG. 10 is a perspective view showing details of left and right rear sections of the vehicle body floor structure shown in FIG. 6. The second embodiment of the vehicle body floor structure includes left and right intersecting joint sections 62 each formed by the aforementioned front floor frame 24 and floor cross member 38 being joined with each other in an intersecting fashion. In each of the intersecting joint sections 62, the floor cross member 38 strides over the front floor frame 24, and the front floor frame 24 has one end fixedly joined to the side sill 34 or 37 provided at a lower end portion of the left or right side body 17 and the other end fixedly joined to the tunnel section 28.

Figure 11:
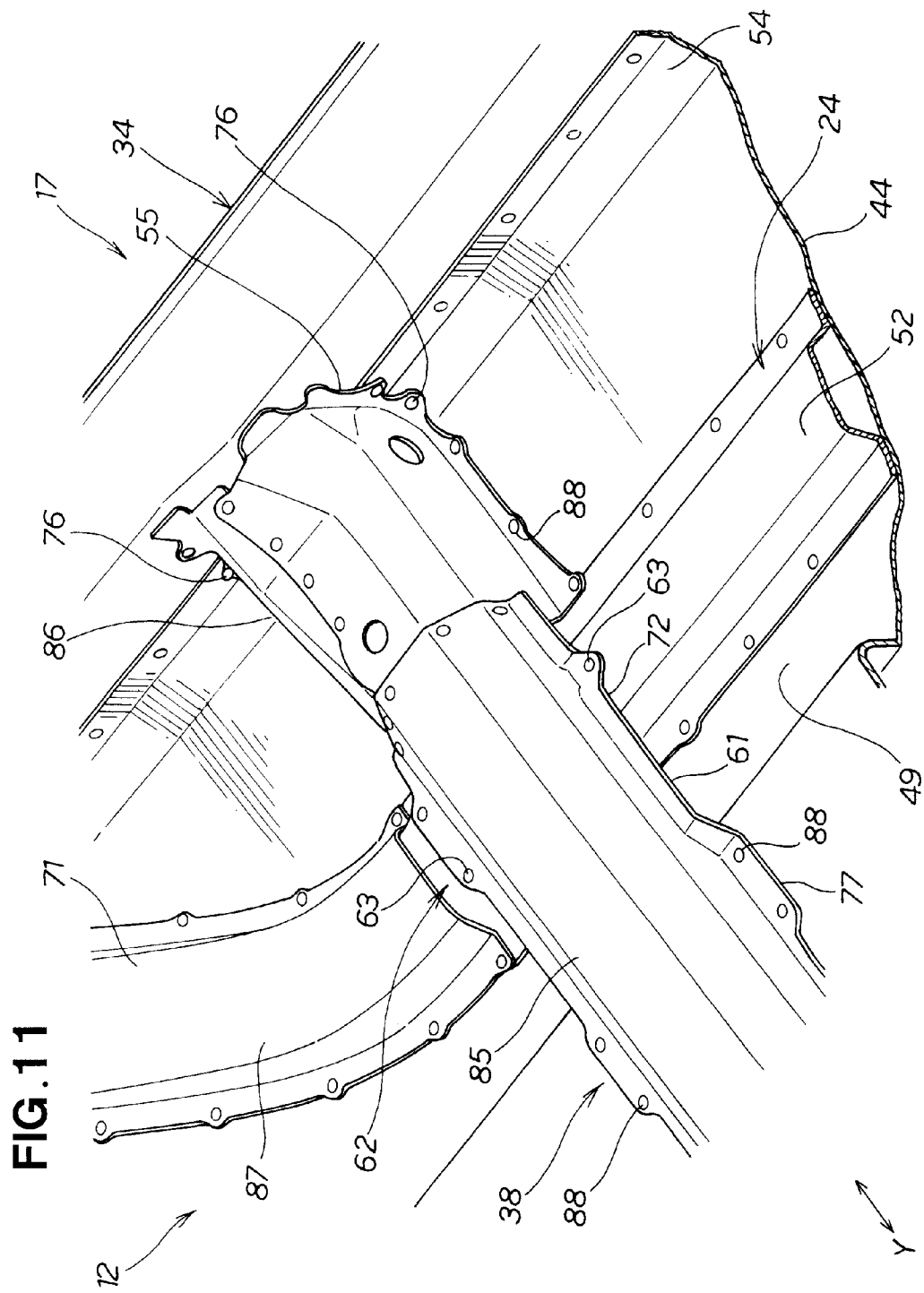
FIG. 11 is a view taken in a direction of arrow A11 of FIG. 10.

FIG. 11 is a view taken in a direction of arrow A11 of FIG. 10, FIG. 12 is a view taken in a direction of arrow A12 of FIG. 10, and FIG. 13 is a view taken in a direction of arrow A13 of FIG. 10.

The floor cross member 38 has a sectional shape of a channel or groove and extends in the width (Y-axis) direction of the vehicle 12. End welding flange portion 55 provided at one end of the floor cross member 38 is fixedly joined, via first welding (spot-welding) portions 76, to the left side sill 34 and raised portion 54 of the floor panel 44, and a groove-edge welding flange portion 77 provided at the other end of the floor cross member 38 is fixedly joined, via second welding (spot-welding) portions 88, to the upper surface 46 of the floor panel 44. As seen from FIG. 11, each of the opposite end portions of the floor cross member 38, fixedly joined to the side sill 34 or 37 and raised portion 54, is formed of two pressed members secured together in overlapping relation to each other.

The floor cross member 38 further includes a recessed intersecting joint section 61 fixedly joined to the front floor frame 24, and an intersecting-welding flange portion 72 of the recessed intersecting joint section 61 is fixedly joined, via third welding (sport-welding) portions 63, to the upper surface of the second groove bottom 52 of the front floor frame 24.

More specifically, the floor cross member 38 comprises interjoined long and short members 85 and 86, and the long member 85 has the recessed intersecting joint section 61 and intersecting-welding flange portion 72 formed thereon. The short member 86 is fixedly joined to the intersecting joint section 61.

With the floor cross member 38 having the short member 86 joined to the long member 85, this embodiment can significantly facilitate plastic formation or processing of the recessed intersecting joint section 61 and intersecting-welding flange portion 72. Further, the materials forming the long and short members 85 and 86 can be changed as necessary, so that the second embodiment can secure a sufficient rigidity while minimizing the necessary manufacturing cost.

Furthermore, the front floor frame 24 has a rear floor frame portion 87 connecting to the intersecting joint section 62 and bent toward the outer side edge (i.e., in a direction of arrow A3) to provide a bent portion 71. Rear end 82 of the bent portion 71 is fixedly joined to the left side sill 34 via fourth welding (spot-welding) portions 73.

The following paragraphs describe behavior of the vehicle body floor structure 11 according to the second embodiment.

In the vehicle body floor structure 11, as shown in FIGS. 8 and 9, the floor panel 44 includes the downwardly concaved floor section 67, and the front floor frame 24 is disposed on the upper surface 49 of the downwardly concaved floor section 67. Thus, even if the front floor frame 24 is provided in the vehicle compartment 13, the front floor frame 24 has generally the same height as the floor body section 66 by virtue of the provision of the downwardly concaved floor section 67. The floor body section 66 has a lower height than the floor panel of the conventionally-known vehicle body floor structures. As a result, the carpet 51 in the vehicle body floor structure 11 can be located at a height position Hd lower than a height position Hc of the carpet 211 put on the floor panel in the conventionally-known floor structures, so that the vehicle compartment 13 can have a greater inner space than in the conventionally-known floor structures.

On the other hand, the rear portion 27 of the front side frame 21 fixedly joined to the lower surface 47 of the floor panel 44, as shown in FIGS. 7 and 8, has generally the same height Hn from the ground surface as the conventional counterparts (e.g., floor frame 224 of FIG. 17), because the front floor frame 24 is provided in the vehicle compartment 13 and the rear portion 27 is formed into a small thickness. As a result, the instant embodiment can enlarge the inner space of the vehicle compartment 13 without sacrificing the ground height and mechanical strength of the vehicle 12.

Figure 14A:
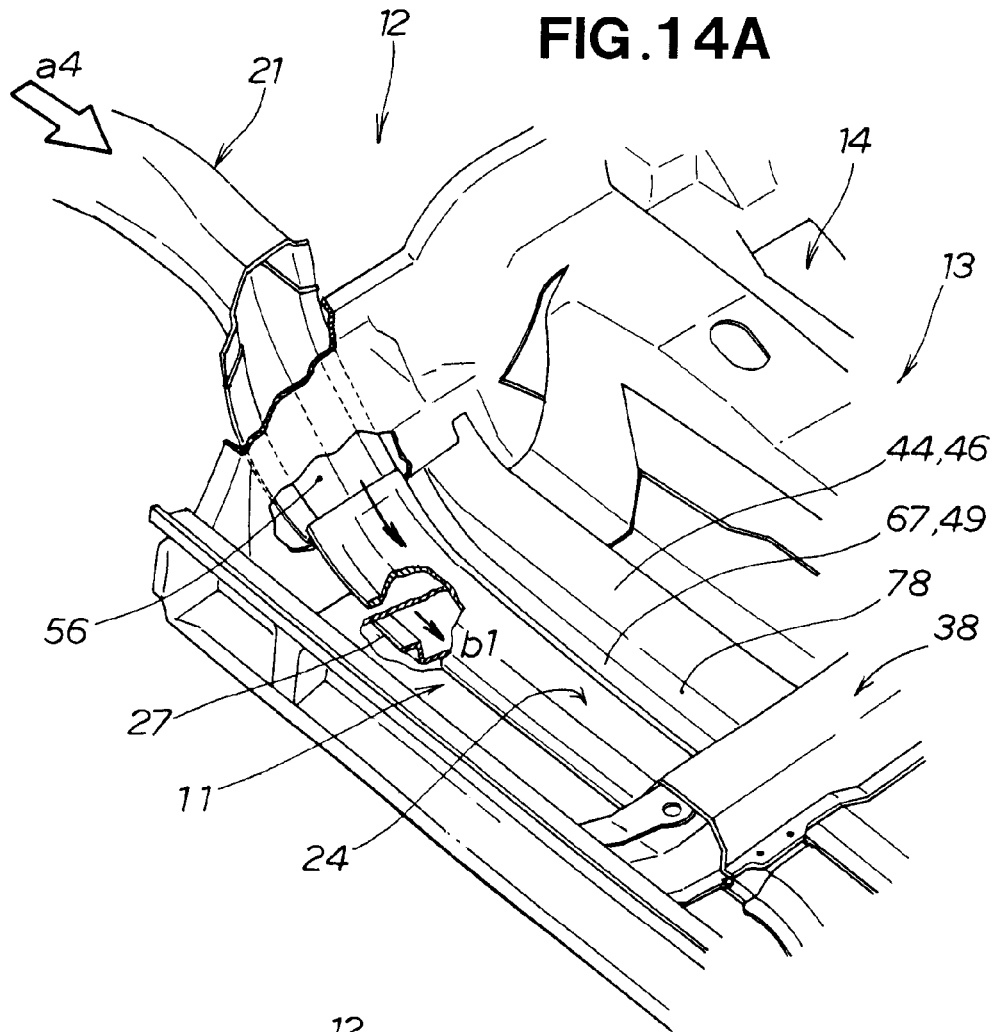
FIGS. 14A and 14B are views illustrating a mechanism employed in the second embodiment of the vehicle body floor structure for dispersing a frontal collision impact.
Figure 14B:
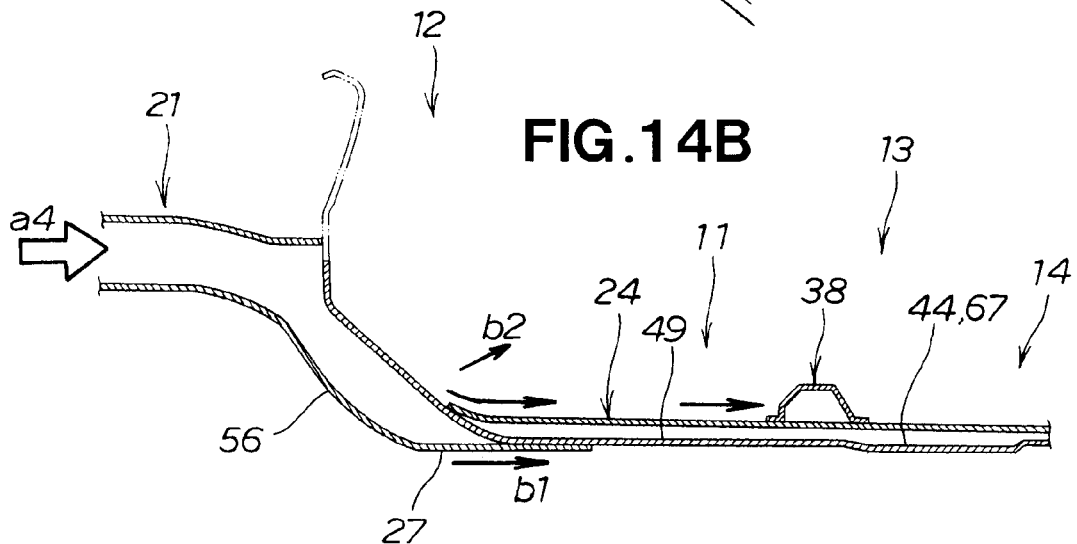

FIGS. 14A and 14B are views explanatory of a mechanism employed in the second embodiment of the vehicle body floor structure 11 for dispersing a frontal collision impact.

When an impact has been applied to the front of the vehicle 12 as indicated by arrow a4, it acts on the front floor frames 24 as a compressive load and thus can be dispersed via the front floor frames 24, so that the floor structure 11 can secure a sufficient mechanical strength. Therefore, no particular reinforcing member has to be provided, which can reduce the overall weight of the floor structure 11.

More specifically, when an impact has been applied to the front of the vehicle 12 as indicated by arrow a4 and then transmitted to the rear portions 27 of the front side frames 21 as indicated by arrow b1, it would lift up the curved portions 56 (in a direction of arrow b2) in most cases. However, because the front floor frames 24 are each disposed on the upper surface 49 of the downwardly concaved floor section 67 of the floor panel 44, the impact can be transmitted to the front floor frames 24 as just a compressive force, so that the vehicle body floor structure 11 can secure a sufficient mechanical strength.

Further, because the applied impact is also transmitted to the floor rib portion 78 formed on each of the concaved floor section 67 shown in FIGS. 8 and 9, the impact can be dispersed via the rib portion 78, so that the vehicle body floor structure 11 can secure a sufficient mechanical strength with an even further reliability.

Namely, with the vehicle body floor structure 11, which can dispense with particular reinforcing members without sacrificing the mechanical strength, the rear portion 27 (and its neighborhood) of each of the front side frames 21 need not be constructed as a dual structure with some reinforcing member incorporated therein; thus, the vehicle body floor structure 11 can be reduced in weight.

Further, with the vehicle body floor structure 11, where the floor panel 44 has the downwardly concaved floor sections 67 and the front floor frame 24 is disposed on each of the downwardly concaved floor sections 67, the front floor frames 24 do not practically project downwardly from the floor panel 44, so that an airstream flowing under the floor panel 44 during travel of the vehicle is subjected to only a small resistance and thus the vehicle body floor structure 11 can achieve an enhanced aerodynamic performance.

Figure 15:
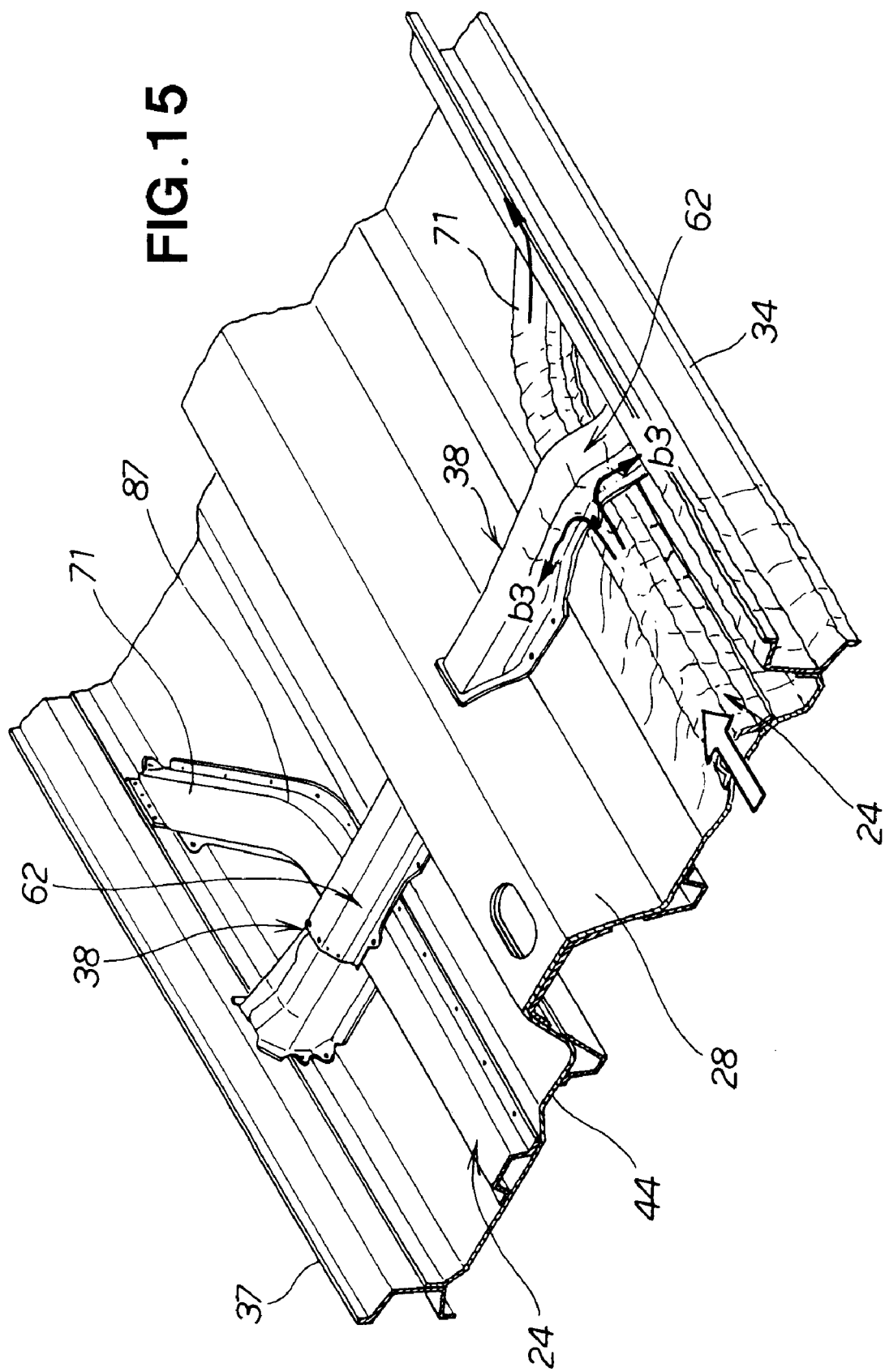
FIG. 15 is a view further explanatory of the mechanism employed in the second embodiment of the vehicle body floor structure for dispersing a frontal collision impact.
Figure 16A:
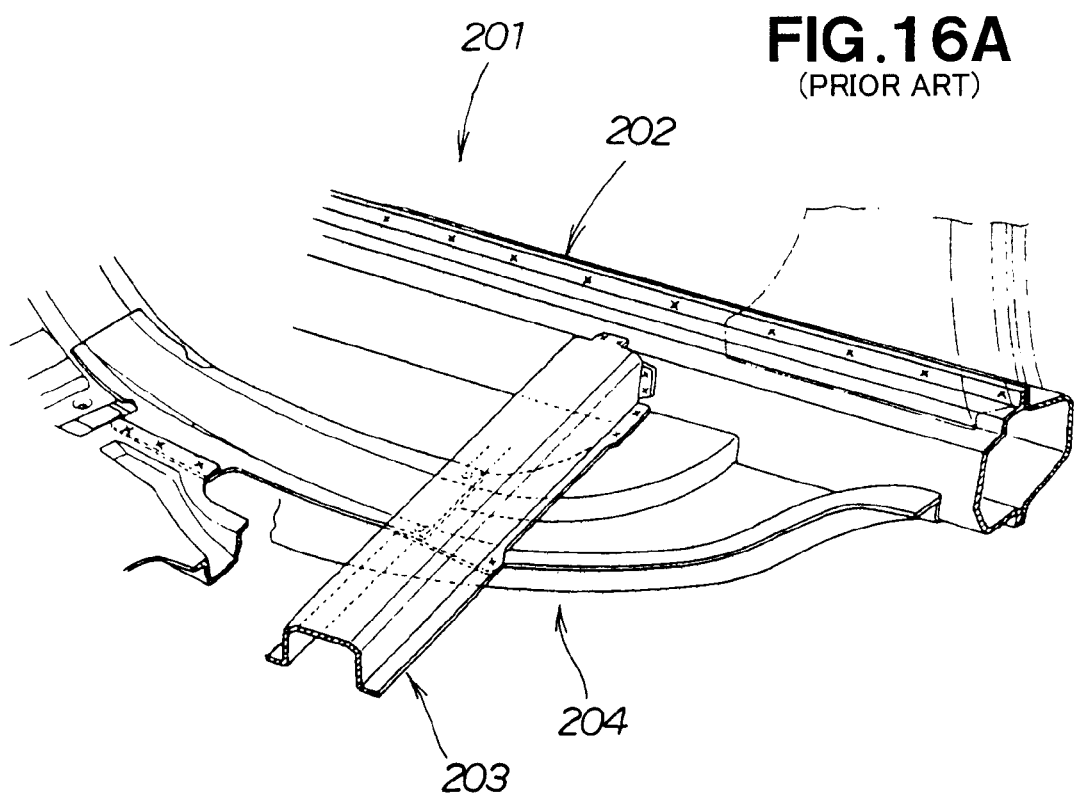
FIGS. 16A and 16B are views illustrating a conventionally-known vehicle body floor structure.
Figure 16B:
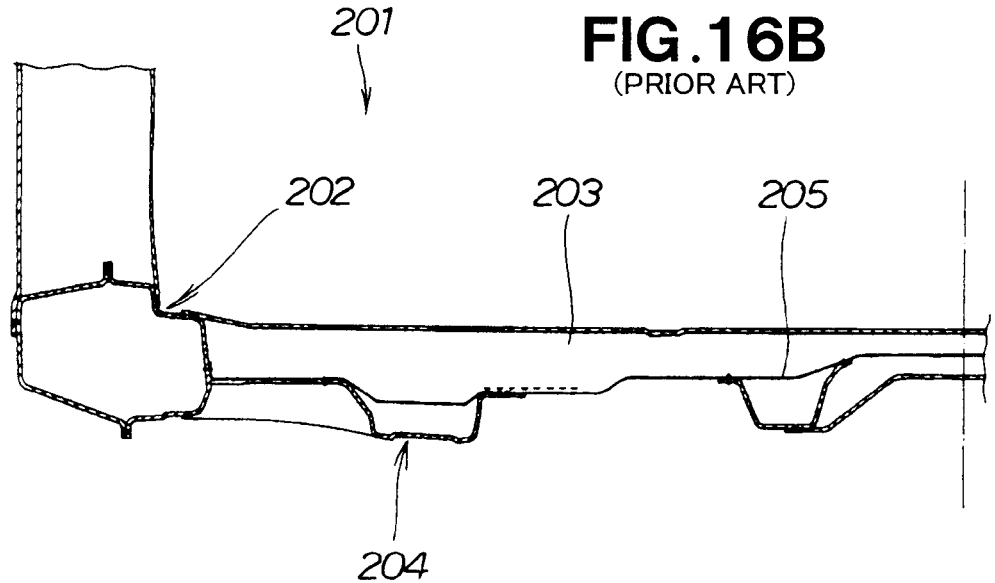

FIG. 15 is a view further explanatory of the mechanism employed in the second embodiment of the vehicle body floor structure 11 for dispersing a frontal collision impact.

When an impact has been applied to the front of the vehicle 12 as indicated by arrow a4, the impact is transmitted to the front floor frames 24 disposed in the vehicle compartment 13, from which it is transmitted from to the floor cross member 38 by way of the intersecting joint sections 62 (including third welding portions 63) as indicated by arrow b3. Further, the impact force transmitted to the front floor frames 24 is transmitted to the left and side sills 34 and 37 by way of the curved bent portions 71. With these arrangement too, the vehicle body floor structure 11 can secure a sufficient rigidity.

Whereas the left front side frame 21 and left front floor frame 24 have been described primarily, the right front side frame 21 and right front floor frame 24 behave similarly to the left front side frame 21 and left front floor frame 24 and hence achieve similar advantages to the left front side frame 21 and left front floor frame 24.

The vehicle body floor structure 11 of the present invention is well suited for use in bodies of automotive vehicles.

What is claimed is:

1. A vehicle body floor structure, comprising:
    a floor panel provided in a floor body constituting a floor of a vehicle compartment;
    a floor cross member disposed on the floor panel and joined to left and right side sills disposed on left and right sides of the floor panel; and
    left and right front floor frames disposed on the floor panel and extending from a dashboard cross member, disposed on a front end of the floor panel, to a substantial middle region of the floor panel through a recessed portion of the floor cross member, the left and right front floor frames each having a rear section located rearwardly of the floor cross member, the rear sections of the left and right front floor frames being bent toward left and right sides of the vehicle compartment to be joined to the left and right side sills, respectively.

2. The vehicle body floor structure of claim 1, wherein portions of the floor panel to which the left and right front frames are attached are positioned lower than a longitudinal middle section of the structure.

3. A vehicle body floor structure, comprising:
    a floor body constituting a floor of a vehicle compartment;
    a floor cross member disposed on a floor panel of the floor body and extending in a width direction of the vehicle;
    left and right front side frames; and
    left and right front floor frames joined to respective rear portions of the left and right front side frames and extending to a substantial middle region of the floor panel,
    the floor panel having a concaved floor section,
    each of the front floor frames being disposed on an upper surface of the concaved floor section, each of the front floor frames extending between the concaved floor section and the floor cross member and joined to the floor cross member.

4. The vehicle body floor structure of claim 3, wherein portions of the left and right front side frames underlie the left and right front floor frames, respectively, with the floor panel interposed therebetween.

5. The vehicle body floor structure of claim 3, wherein the left and right front floor frames each have a rear section located rearwardly of the floor cross member, and the rear sections of the left and right front floor frames are bent toward left and right sides of the vehicle compartment to be joined to left and right side sills, respectively, that connect to left and right outer sides of the floor panel.

6. The vehicle body floor structure of claim 3, wherein the left and right front floor frames are each disposed on the floor panel and extend to a substantial middle region of the floor panel through a recessed portion of the floor cross member, the left and right front floor frames each having a rear section located rearwardly of the floor cross member, the rear sections of the left and right front floor frames being bent toward left and right sides of the vehicle compartment to be joined to the left and right side sills, respectively.

7. The vehicle body floor structure of claim 3, wherein each of opposite end portions of the floor cross member is formed of two pressed members secured together in overlapping relation to each other.

* * * * *